US 8,989,877 B2

(12) United States Patent
Scholte-Wassink

(10) Patent No.: US 8,989,877 B2
(45) Date of Patent: *Mar. 24, 2015

(54) SYSTEM AND METHOD FOR CONTROLLING A MACHINE

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 632 days.

This patent is subject to a terminal disclaimer.

(21) Appl. No.: 13/311,118

(22) Filed: Dec. 5, 2011

(65) Prior Publication Data

US 2012/0078390 A1   Mar. 29, 2012

Related U.S. Application Data

(63) Continuation of application No. 12/639,428, filed on Dec. 16, 2009, now Pat. No. 8,073,556.

(51) Int. Cl.
| | |
|---|---|
| G05B 13/02 | (2006.01) |
| G06F 19/00 | (2011.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G06G 7/70 | (2006.01) |
| G05B 13/04 | (2006.01) |
| G05B 17/02 | (2006.01) |

(52) U.S. Cl.
CPC .............. *G05B 13/048* (2013.01); *G05B 17/02* (2013.01); *G05B 2219/2619* (2013.01)
USPC ................... 700/45; 700/30; 700/33; 700/37; 700/169; 700/170; 700/173; 700/177; 700/287; 701/100; 701/102

(58) Field of Classification Search
CPC ...... G05B 13/02; G05B 13/04; G05B 13/042; G05B 15/02; G05B 17/02; G05B 19/41885; G05B 2219/31103; G05B 2219/31104; G05B 23/0221
USPC ........... 700/28–34, 37, 44, 45, 108, 117, 121, 700/159, 169, 170, 173, 174, 177, 286, 700/287; 701/99–103, 105, 110
See application file for complete search history.

(56) References Cited

U.S. PATENT DOCUMENTS

| | | |
|---|---|---|
| 6,587,744 B1 | 7/2003 | Stoddard et al. |
| 6,961,626 B1 | 11/2005 | Paik |
| 6,999,836 B2 | 2/2006 | Schwarm et al. |
| 7,054,734 B2 | 5/2006 | Todoroki et al. |
| 7,103,445 B2 | 9/2006 | Athman et al. |
| 7,113,834 B2 | 9/2006 | Wojsznis et al. |
| 7,349,753 B2 | 3/2008 | Paik |
| 7,620,462 B2 | 11/2009 | Higuchi et al. |
| 7,813,867 B2 | 10/2010 | Yasui et al. |
| 7,866,403 B1 | 1/2011 | Borgstadt |
| 2008/0167744 A1 | 7/2008 | Sakano |
| 2009/0281652 A1 | 11/2009 | Tashiro et al. |

*Primary Examiner* — Crystal J Barnes-Bullock
(74) *Attorney, Agent, or Firm* — Dority & Manning, P.A.

(57) ABSTRACT

A system for controlling a machine includes a first model, a second model, a controller, and a comparator. During a first cycle, the first model generates a response signal to the controller while the second model generates a predicted parameter signal. During the first cycle, the comparator transmits a feedback signal to the second model if a predetermined threshold is not met. A method for controlling a machine includes transmitting a response signal from a first model to a controller, generating a control signal to the machine, and generating a predicted parameter value in a second model. The method further includes transmitting a feedback signal to the second model if a predetermined threshold is not met.

14 Claims, 6 Drawing Sheets

SYSTEM AND METHOD FOR CONTROLLING A MACHINE

RELATED APPLICATIONS

The present application is a Continuation Application of U.S. Pat. No. 8,073,556 entitled "System and Method for Controlling a Machine", Ser. No. 12/639,428, filed on Dec. 16, 2009, all of which is hereby incorporated herein by reference in its entirety for all purposes. Any disclaimer that may have occurred during prosecution of the above-referenced application is hereby expressly rescinded.

FIELD OF THE INVENTION

The present invention generally involves a control system for a machine. Specifically, the present invention describes and enables a controller that may be used with a machine such as generator or a motor to regulate the operation of the machine according to desired parameters.

BACKGROUND OF THE INVENTION

Machines such as motors and generators typically include a control system for regulating various parameters in the machine. For example, a motor may include a control system that regulates the torque or speed of the motor to prevent the motor from overheating. Similarly, a generator may include a controller that regulates the current or voltage produced by the generator.

Various circuits and methods are known in the art for controlling machines. For example, a control system may operate essentially according to trial and error by issuing a control signal to alter the operation of the machine and then varying the magnitude of the control signal based on the machine's response to the control signal. For example, a controller attempting to raise the output voltage of a generator may issue an initial control signal and then adjust that initial control signal depending on the resulting change in the output voltage of the generator. While simple in its methodology, this trial and error approach typically requires more time to achieve the desired operating level of the machine, and it may result in excessive hunting until the machine stabilizes at the desired operating level.

To avoid the disadvantages of trial and error, some control systems may include programming or circuitry that models the operation of the machine. The control system accesses the programming or circuitry to generate an appropriate control signal that efficiently and precisely alters the machine operation to produce the desired parameter value. In some cases, the programming or circuitry may be generic to an entire class of machines, while in other cases, the programming or circuitry may be specifically tailored to each type of machine, or, more particularly, to an individual machine in a class of machines.

The ability of the control system to accurately and efficiently regulate the machine is directly dependent on the ability of the programming or circuitry to accurately model the operation of the particular machine. For example, in the field of wind turbine generators, many different generator designs exist to allow the optimum production of power in varying environmental situations. Many differences (e.g., the length, balance, and pitch of the rotating blades) exist between the various generator designs and even between individual generators in each design. In addition, variables unique to each installation (e.g., wind speed, atmospheric pressure, and humidity) may change over time or between seasons to vary the performance of individual generators. Lastly, changes in the generator over the life of the generator (e.g., friction, corrosion, changes in balance) may alter the operating characteristics of the generator.

Therefore the need exists for an improved control system for machines. Ideally, the improved control system may include a model of the machine's operating characteristics that can be updated or adjusted to reflect the actual performance of the machine over time.

BRIEF DESCRIPTION OF THE INVENTION

Aspects and advantages of the invention are set forth below in the following description, or may be obvious from the description, or may be learned through practice of the invention.

In one embodiment of the present invention, a system for controlling a machine includes an input signal, a first parameter signal, a first model, and a controller. The input signal conveys a desired operating parameter of the machine, and the first parameter signal conveys a measured parameter of the machine taken at a first time. During a first cycle, the first model receives the input signal and the first parameter signal and generates a response signal based on the input signal and the first parameter signal. The controller receives the response signal and generates a control signal to the machine based on the response signal. The system further includes a second model, a second parameter signal, a feedback circuit, and a comparator. During the first cycle, the second model receives the first parameter signal and the control signal and generates a predicted parameter signal based on the first parameter signal and the control signal. The second parameter signal conveys the measured parameter of the machine taken at a second time, and the feedback circuit receives the second parameter signal and the predicted parameter signal and generates a feedback signal based on the second parameter signal and the predicted parameter signal. During the first cycle, the comparator receives the feedback signal and transmits the feedback signal to the second model if a predetermined threshold is not met.

Another embodiment of the present invention is a method for controlling a machine that includes measuring a parameter at a first time to determine a first parameter value and comparing the first parameter value to a desired value. In a first cycle, the method includes transmitting a response signal from a first model to a controller based on the comparison between the first parameter value and the desired value and transmitting a control signal from the controller to the machine to vary the first parameter value. In the first cycle, the method further includes measuring the parameter at a second time to determine a second parameter value, generating a predicted parameter value from a second model based on the first parameter value and the control signal, and comparing the predicted parameter value to the second parameter value. The method further includes generating a feedback signal based on the predicted parameter value and the second parameter value and, in the first cycle, transmitting the feedback signal to the second model if a predetermined threshold is not met.

In another embodiment of the present invention, a method for controlling a machine includes measuring a parameter at a first time to determine a first parameter value and receiving a desired value into a controller. In a first cycle, the method includes transmitting a request signal from the controller to a first model based on the first parameter value and the desired value, transmitting a response signal from the first model to the controller, and transmitting a control signal from the controller to the machine to vary the first parameter value. The method further includes measuring the parameter at a second time to determine a second parameter value and, in the first cycle, generating a predicted parameter value from a second model based on the first parameter value and the control signal. The method further includes comparing the predicted parameter value to the second parameter value, generating a feedback signal based on the predicted parameter value and the second parameter value, and, in the first cycle, transmitting the feedback signal to the second model if a predetermined threshold is not met.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
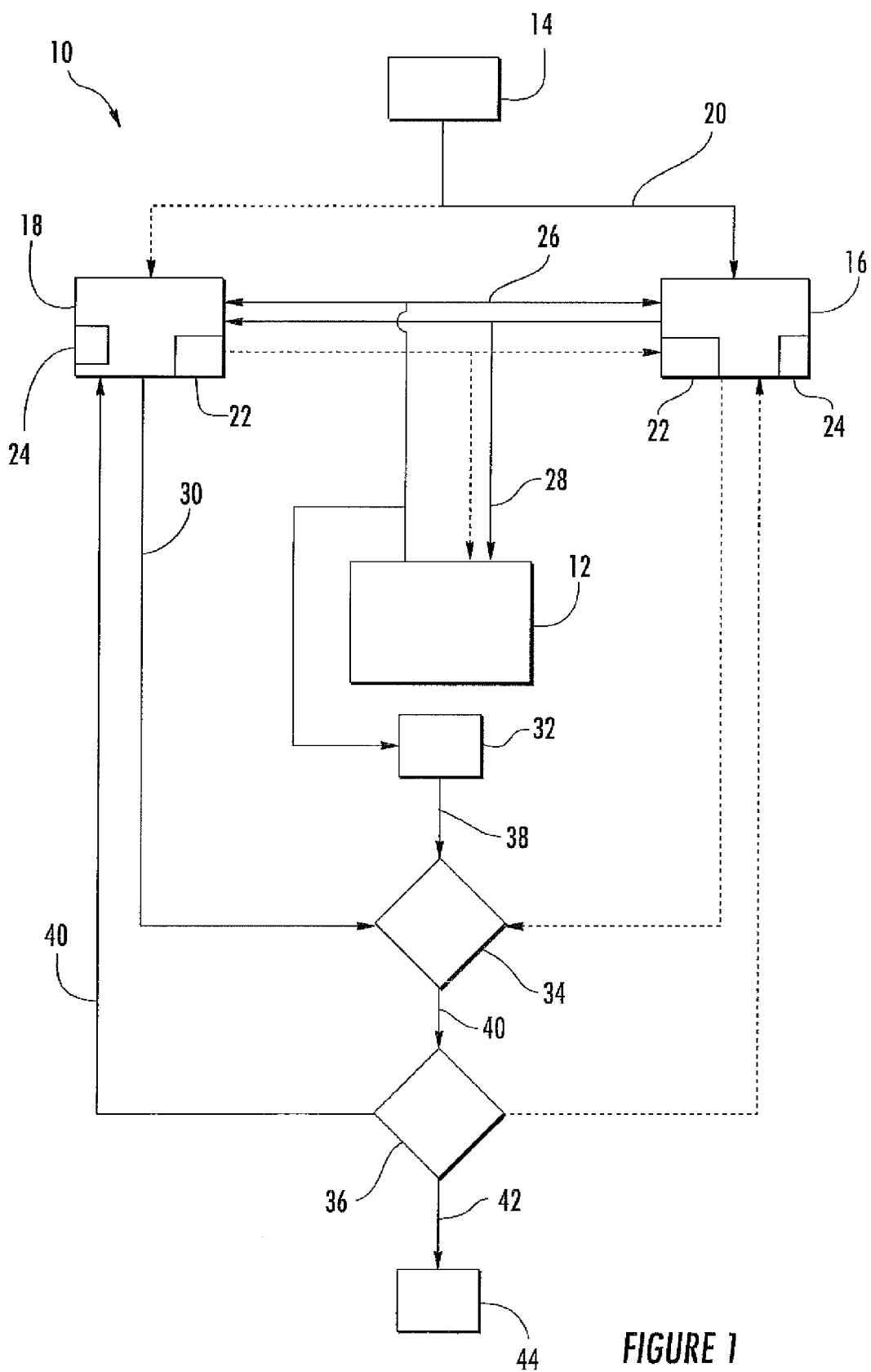
FIG. 1 shows a simplified block diagram of a control system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
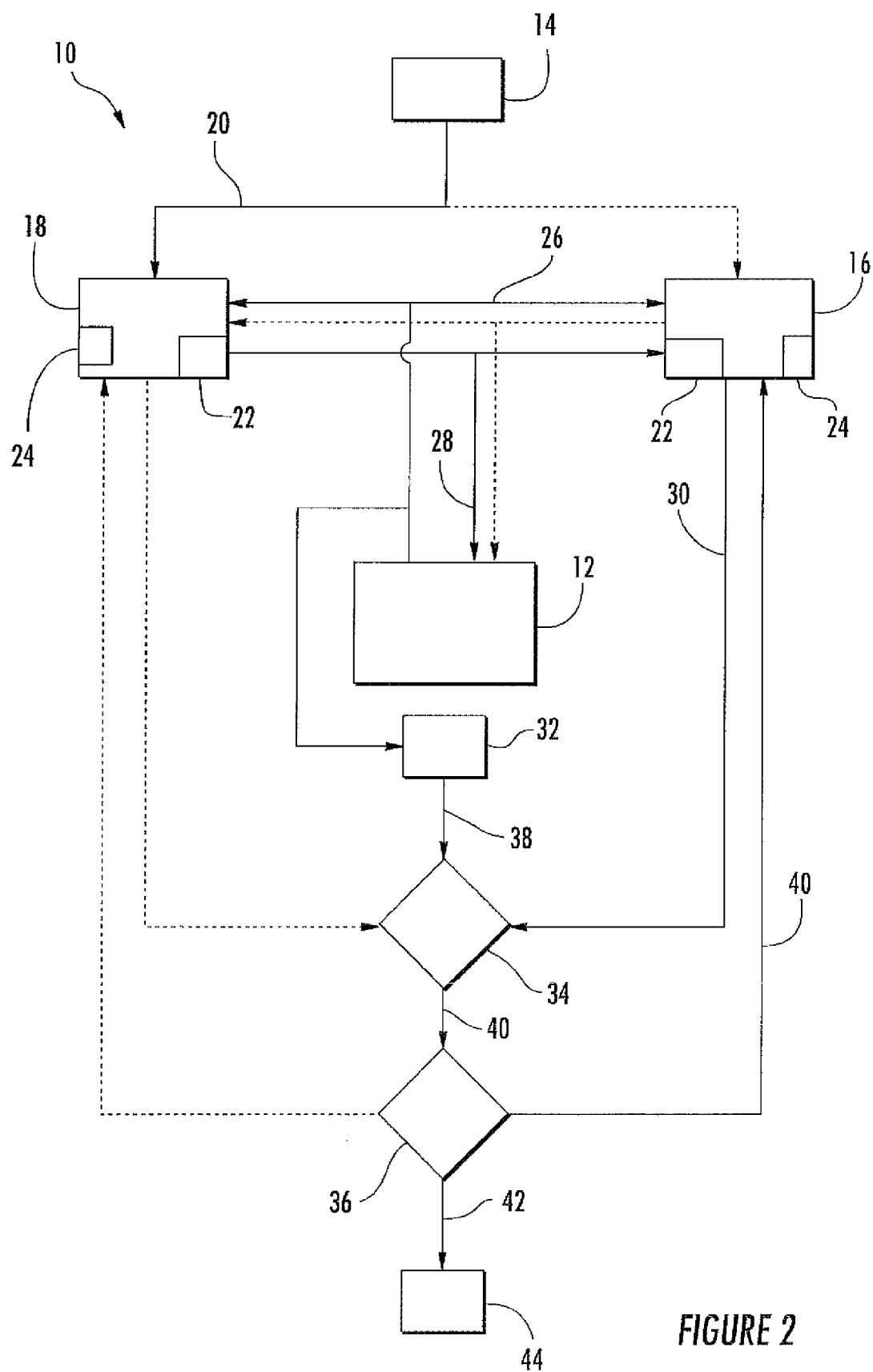
FIG. 2 shows a simplified block diagram of the control system shown in FIG. 1 after a predetermined threshold is met.

FIGS. 1 and 2 show a simplified block diagram of a control system 10 according to one embodiment of the present invention. FIG. 1 shows communication lines in the system 10 during a first cycle, and FIG. 2 shows the communication lines in the system 10 during a second or subsequent cycle after a predetermined threshold has been met. The solid lines in each figure represent the active communication lines, while the dashed lines in each figure represent the inactive communication lines. Although this embodiment is illustrated and described in the context of a wind turbine generator 12, one of ordinary skill in the art would understand that the concepts, structure, and methods described in the present application would be equally applicable to any generator, motor, or other machine.

As shown in FIG. 1, the system 10 includes an input device 14, a first controller 16, and a second controller 18. The input device 14 may include any structure for providing an interface between a user and the system 10. For example, the input device 14 may include a keyboard, computer, terminal, tape drive, and/or any other device for receiving input from a user and providing the input to the system 10. The input device 14 generates an input signal 20 which conveys a desired operating parameter for the wind turbine generator 12. The operating parameter may be any measurable parameter generated by the wind turbine generator 12, such as, for example, voltage, current, power, or torque.

The first 16 and second 18 controllers may include various components such as memory/media elements 22 and/or coprocessors 24 that store data, store software instructions, and/or perform subroutines called for by the respective controller. The various memory/media elements may be one or more varieties of computer readable media, such as, but not limited to, any combination of volatile memory (e.g., RAM, DRAM, SRAM, etc.), non-volatile memory (e.g., flash drives, hard drives, magnetic tapes, CD-ROM, DVD-ROM, etc.), and/or other memory devices (e.g., diskettes, magnetic based storage media, optical storage media, etc.). The respective controllers may access the data and/or software instructions stored in the associated memory/media elements. Any possible variations of data storage and processor configurations will be appreciated by one of ordinary skill in the art.

The system 10 operates on a cyclic basis. During one cycle, the first controller 16 regulates the operation of the wind turbine generator 12, and the second controller 18 receives feedback signals to refine its ability to accurately predict the operation of the wind turbine generator 12. When a predetermined threshold is met during the first or subsequent cycles, the operation of the first 16 and second 18 controllers switches so that the second controller 18 regulates the wind turbine generator 12 while the first controller 16 receives feedback signals.

For example, during the first cycle shown in FIG. 1, the first controller 16 receives the input signal 20 from the input device 14 and a first parameter signal 26 from the wind turbine generator 12. The first parameter signal 26 conveys a measured parameter of the wind turbine generator 12, such as voltage or current, taken at a first time. The first controller 16 may access the memory/media element 22 or coprocessor 24, as previously described, to generate a control signal 28 to the wind turbine generator 12 based on the input signal 20 and the first parameter signal 26. The control signal 28 conveys information or instructions to the wind turbine generator 12 to alter the operation of the wind turbine generator 12 and thereby change the value of the measured parameter. For example, the input signal 20 may convey a desired output voltage of 400 volts, and the first parameter signal 26 may indicate an output voltage from the wind turbine generator 12 of 398 volts. Using the data and/or instructions stored in the memory/media element 22 and/or coprocessor 24, the first controller 16 may generate the control signal 28 to the wind turbine generator 12 that changes the excitation field of the wind turbine generator 12 to increase the output voltage from 398 volts to 400 volts.

Substantially simultaneously during the first cycle, the second controller 18 receives the first parameter signal 26 from the wind turbine generator 12 and the control signal 28 from the first controller 16. The second controller 18 may access the memory/media element 22 or coprocessor 24, as previously described, to generate a predicted parameter signal 30 based on the first parameter signal 26 and the control signal 28. The predicted parameter signal 30 conveys the anticipated response of the wind turbine generator 12 to the control signal 28. For example, if the first parameter signal 26 conveyed an output voltage of 398 volts, and the control signal 28 increased the excitation field by 2 millivolts, the second controller 18 may predict that, in response to the control signal 28, the wind turbine generator 12 will produce a new output voltage of 399 volts (i.e., the predicted parameter signal 30).

The system 10 shown in FIGS. 1 and 2 further includes a delay circuit 32, a feedback circuit 34, and a comparator 36 to provide feedback to the first 16 or second 18 controllers. The delay circuit 32, feedback circuit 34, and comparator 36 may reside in the first 16 and/or second 18 controllers and utilize the processing capability and/or memory/media elements available in the first 16 and/or second 18 controllers. Alternatively, the delay circuit 32, feedback circuit 34, and/or comparator 36 may be implemented by hardwire logic or other circuitry, including, but not limited to application specific circuits.

The delay circuit 32 receives the first parameter signal 26 and indexes the first parameter signal 26 to the time at which the first parameter was measured. The delay circuit 32 produces a second parameter signal 38 indexed to a second time, and the second parameter signal 38 corresponds to the measured parameter after the wind turbine generator 12 has received and acted on the control signal 28.

The feedback circuit 34 receives the second parameter signal 38 from the delay circuit 32 and the predicted parameter signal 30 from the second controller 18. The feedback circuit 34 compares the second parameter signal 38 to the predicted parameter signal 30 and generates a feedback signal 40. The comparator 36 receives the feedback signal 40 and transmits the feedback signal 40 to the first controller 16 if a predetermined threshold is not met. The predetermined threshold may be a time interval, an acceptable magnitude for the feedback signal 40, or any other metric that indicates the ability of the second controller 18 to accurately predict the wind turbine generator's 12 response to the control signal 28. In this manner, if the predetermined threshold is not met during the first cycle, the comparator 36 transmits the feedback signal 40 to the second controller 18, and the second controller 18 may then use the feedback signal 40 to update the stored data or programming to refine the second controller's 18 ability to accurately predict the wind turbine generator's 12 response to the control signal 28.

If the predetermined threshold is met during the first cycle, the comparator 36 sends a signal 42 to a switch 44 to change the operation of the first 16 and second 18 controllers for the second or subsequent cycle, as shown in FIG. 2. During the second or subsequent cycle, the second controller 18 receives the input signal 20 and the first parameter signal 26 and generates the control signal 28 to the wind turbine generator 12 based on the input signal 20 and the first parameter signal 26. Similarly, during the second or subsequent cycle, the first controller 16 receives the first parameter signal 26 and the control signal 28 (now from the second controller 18) and generates the predicted parameter signal 30 based on the first parameter signal 26 and the control signal 28. During the second cycle, the comparator 36 transmits the feedback signal 38 to the first controller 16 if the predetermined threshold is not met.

During operation, the system 10 uses one of the first 16 or second 18 controllers to regulate the wind turbine generator 12, while the other of the second 18 or first 16 controller receives feedback signals to refine the controller's ability to accurately predict the wind turbine generator's response to the control signal 28. For example, during the first cycle, the first controller 16 receives the input signal 20 and the first parameter signal 26 and generates the control signal 28 to the wind turbine generator 12 to change the first parameter to equal the input signal 20. Substantially simultaneously, the second controller 18 receives the first parameter signal 26 and the control signal 28 from the first controller 16 and generates the predicted parameter signal 30 that estimates the wind turbine generator's 12 response to the control signal 28 from the first controller 16. The delay circuit 32 produces the second parameter signal 38 indexed to the output of the wind turbine generator 12 after the wind turbine generator 12 responds to the control signal 28. The feedback circuit 34 compares the predicted parameter signal 30 to the second parameter signal 38, and if the predetermined threshold (for example a time interval or a maximum difference between the predicted parameter signal 30 and the second parameter signal 38) is not met, then the comparator 36 transmits the feedback signal 40 back to the second controller 18. The feedback signal 40 then updates the data and/or programming stored in the second controller 18 to refine or improve the ability of the second controller 18 to accurately predict the wind turbine generator's 12 response to the control signal 28 (i.e., reduce the difference between the predicted parameter signal 30 and the second parameter signal 38). The system 10 continues to operate in subsequent cycles with the first controller 16 regulating the wind turbine generator 12 and the second controller 18 receiving additional feedback signals 40 until the predetermined threshold is met.

When the predetermined threshold is met, the comparator 36 sends a signal 42 to switch the operation of the first 16 and second 18 controllers during subsequent cycles, as shown in FIG. 2. During the second or subsequent cycle, the second controller 18 now receives the input signal 20 from the input device 14 and the first parameter signal 26 from the wind turbine generator 12 and generates the control signal 28 to the wind turbine generator 12. During the second or subsequent cycle, the first controller 16 receives the first parameter signal 26 from the wind turbine generator 12 and the control signal 28 from the second controller 18 and generates the predicted parameter signal 30. The delay circuit 32 generates the second parameter signal 38, as previously discussed, and the feedback circuit 34 compares the second parameter signal 38 to the predicted parameter signal 30 from the first controller 16 to generate the feedback signal 40. During this second or subsequent cycle, the comparator 36 transmits the feedback signal 40 to the first controller 16 if the predetermined threshold is not met. In this manner, during the second or subsequent cycle, the second controller 18 regulates the operation of the wind turbine generator 12, while the first controller 16 receives feedback signals 40 to refine or improve the ability of the first controller 16 to accurately predict the wind turbine generator's 12 response to the control signal 38. When the predetermined threshold is met during the second or subsequent cycle, the comparator 36 transmits the signal 42 to the switch 44, and the communication lines switch back to the configuration as shown in FIG. 1, and the process repeats.

Figure 3:
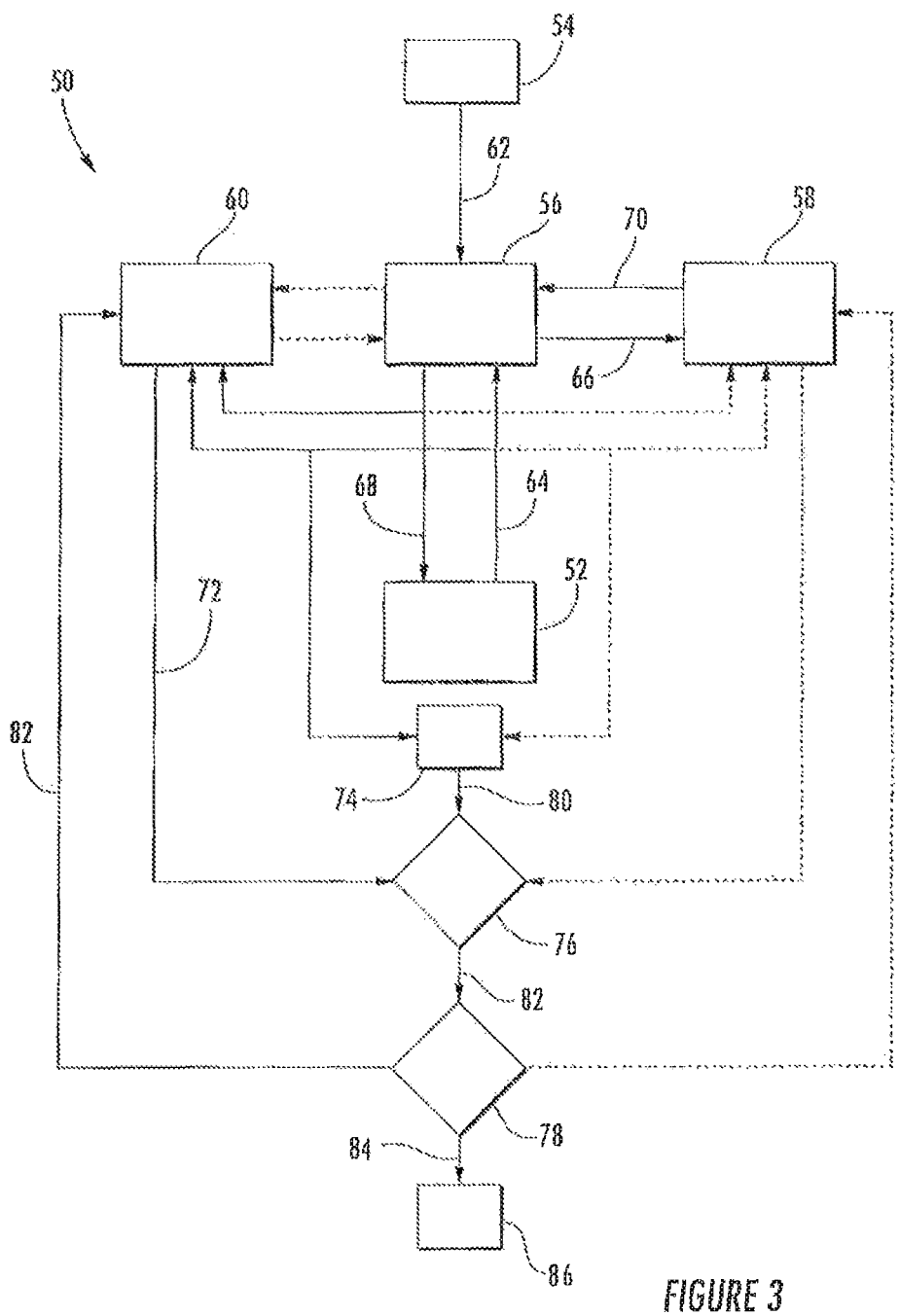
FIG. 3 shows a simplified block diagram of a control system according to a second embodiment of the present invention.
Figure 4:
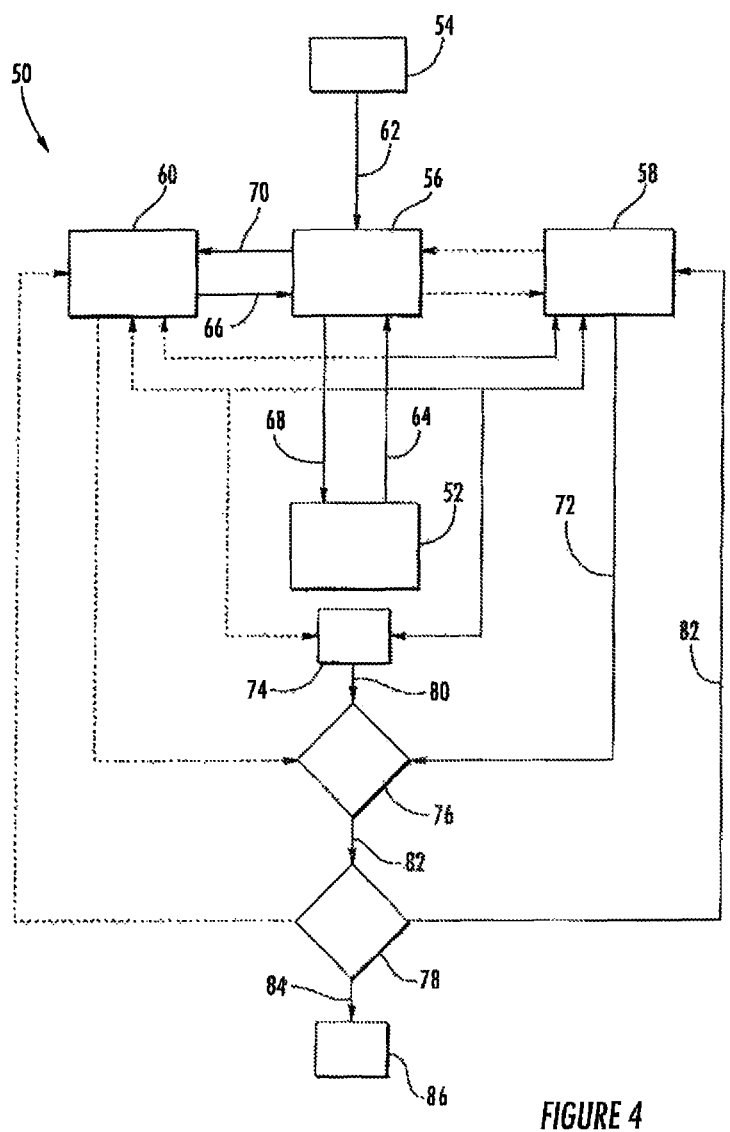
FIG. 4 shows a simplified block diagram of the control system shown in FIG. 3 after a predetermined threshold is met.

FIGS. 3 and 4 show a system 50 for controlling a machine 52 according to an alternate embodiment of the present invention. The system 50 again includes an input device 54 as previously discussed. In addition, the system 50 includes a controller 56, a first model 58, and a second model 60. The controller 56, first model 58, and second model 60 may include processors and/or memory/media elements, as previously discussed with respect to the first 16 and second 18 controllers described and illustrated in FIGS. 1 and 2.

In the embodiment shown in FIGS. 3 and 4, the controller 56 receives an input signal 62 from the input device 54 and a first parameter signal 64 from the machine 52. The first parameter signal 64 conveys a measured parameter of the machine 52, such as voltage or current, taken at a first time. The controller 56 generates a request signal 66 that seeks information needed to generate a control signal 68 that will change the first parameter signal 64 to equal the input signal 62. For example, if the input signal 62 conveys a desired speed of 500 rpm and the first parameter signal 64 conveys a measured speed of 450 rpm, the request signal 66 seeks information that can be used to generate the control signal 68 to change the actual speed from 450 rpm to 500 rpm.

During a first cycle, the first model 58 receives the request signal 66 from the controller 56 and accesses the stored data and/or instructions to generate a response signal 70. The response signal 70 conveys information to the controller 56 so the controller 56 can generate the control signal 68 to change the output of the machine 52 to match the desired operating parameter conveyed by the input signal 62.

Substantially simultaneously during this first cycle, the second model 60 receives the first parameter signal 64 from the machine 52 and the control signal 68 from the controller 56. The second model 60 accesses the stored data and/or instructions to generate a predicted parameter signal 72 that estimates the machine's 52 response to the control signal 68.

The system 50 includes a delay circuit 74, feedback circuit 76, and comparator 78, as previously discussed with respect to the embodiment illustrated in FIGS. 1 and 2. The delay circuit 74 generates a second parameter signal 80 indexed to a second time, and the second parameter signal 80 corresponds to the measured parameter after the machine 52 has received and acted on the control signal 68. The feedback circuit 76 compares the second parameter signal 80 to the predicted parameter signal 72 to generate a feedback signal 82. The comparator 78 transmits the feedback signal 82 to the second model 60 if a predetermined threshold is not met. The system 50 continues to operate during subsequent cycles with the first model 58 providing the response signal 70 to the controller 56 and the second model 60 providing the predicted parameter signal 72 to the feedback circuit 76 until the predetermined threshold is met. When the predetermined threshold is met, the comparator 78 sends a signal 84 to a switch 86 to change the communication lines between the system 50 components as shown in FIG. 4.

As shown in FIG. 4, during a second or subsequent cycle, the second model 60 receives the request signal 66 from the controller 56 and generates the response signal 70 based on the request signal 66. During the second or subsequent cycle, the first model 58 receives the first parameter signal 64 from the machine 52 and the control signal 68 from the controller 56 and generates the predicted parameter signal 72. During the second or subsequent cycle, the comparator 78 transmits the feedback signal 82 to the first model 58 if the predetermined threshold is not met. In this manner, during the second or subsequent cycle, the controller 56 regulates the operating parameter of the machine 52 based on information provided by the second model 60, while the first model 58 receives feedback signals 82 to refine or improve the ability of the first model 58 to accurately predict the machine's response to the control signal 68. As previously discussed with respect to the embodiment shown in FIGS. 1 and 2, the predetermined threshold may be a time interval, magnitude of the feedback signal, or other metric indicative of the ability of the first model 58 to accurately predict the machine's response to the control signal 68.

Figure 5:
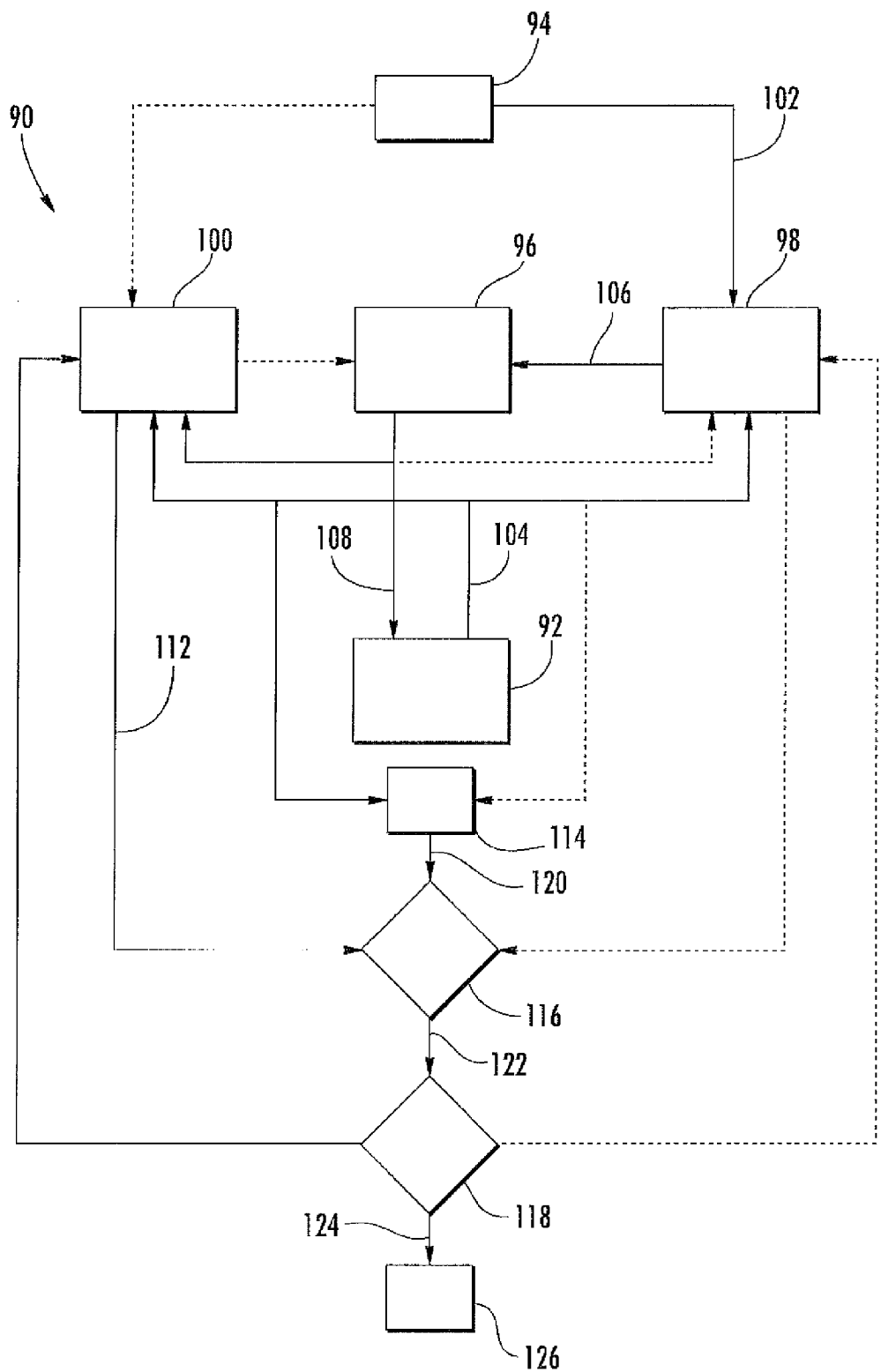
FIG. 5 shows a simplified block diagram of a control system according to a third embodiment of the present invention.
Figure 6:
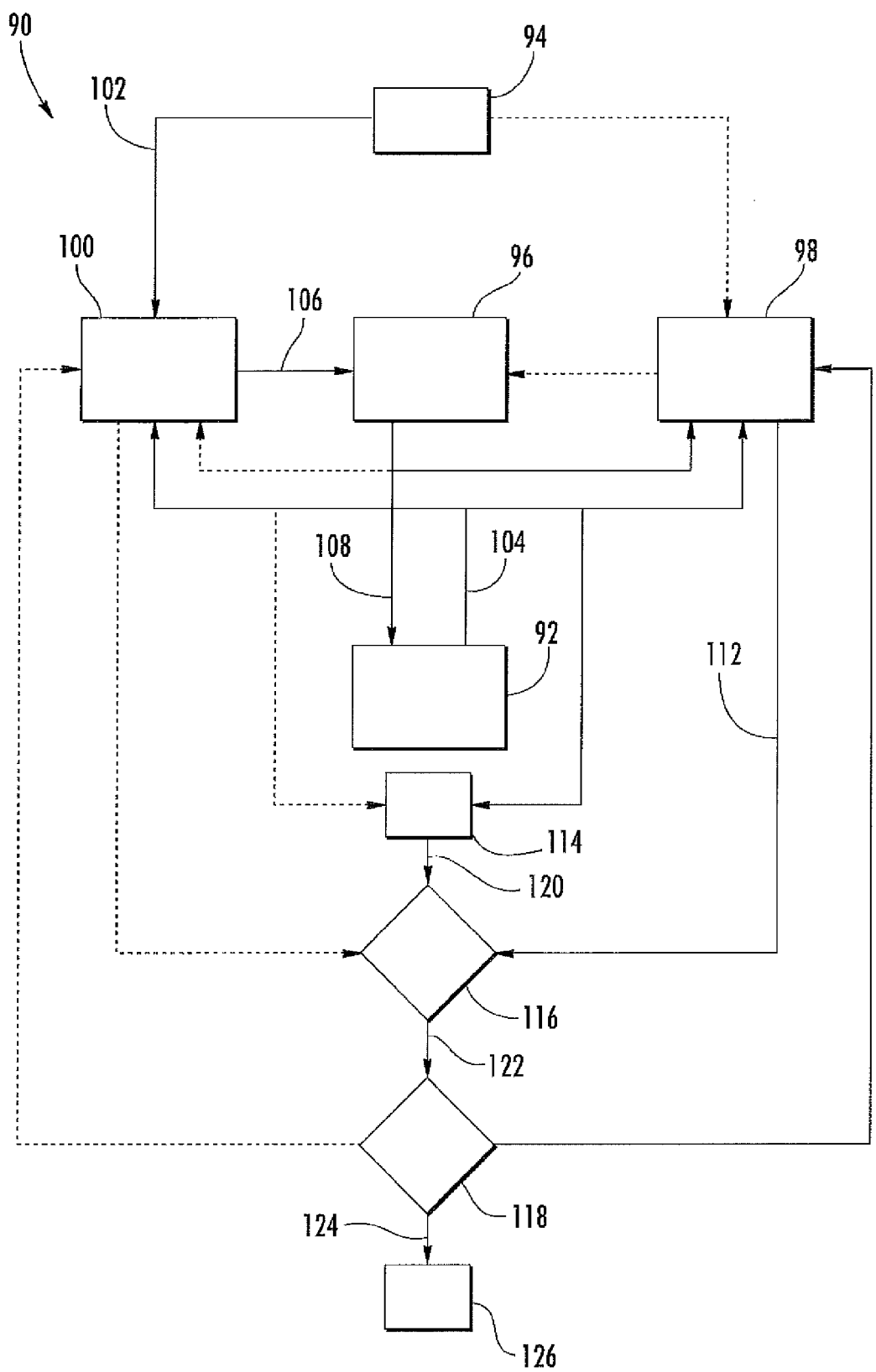
FIG. 6 shows a simplified block diagram of the control system shown in FIG. 5 after a predetermined threshold is met.

FIGS. 5 and 6 show another embodiment of a system 90 for controlling a machine 92. The system 90 again includes an input device 94, controller 96, first model 98, and second model 100, as previously discussed with respect to the embodiment shown in FIGS. 3 and 4. In the embodiment shown in FIGS. 5 and 6, the first model 98 receives an input signal 102 from the input device 94 and a first parameter signal 104 from the machine 92. The first model 98 accesses the stored data and/or instructions to produce a response signal 106 based on the input signal 102 and the first parameter signal 104. For example, if the input signal 102 conveys a desired speed of 100 rpm and the first parameter signal conveys a measured speed of 110 rpm, the first model 98 generates a response signal 106 to the controller 96 that includes the information necessary for the controller 96 to generate an appropriate control signal 108 to change the operating speed of the machine from 110 rpm to 100 rpm.

Substantially simultaneously during the first cycle, the second model 100 receives the first parameter signal 104 from the machine and the control signal 108 from the controller 96. The second model 100 accesses the stored data and/or instructions to generate a predicted parameter signal 112 which represents the second model's 100 estimate of the machine's 92 response to the control signal 108.

The system again includes a delay circuit 114, feedback circuit 116, and comparator 118 as previously described with respect to the embodiments shown in FIGS. 1 through 4. The delay circuit 114 generates a second parameter signal 120 indexed to a second time, and the second parameter signal 120 corresponds to the measured parameter after the machine 92 has received and acted on the control signal 108. The feedback circuit 116 compares the second parameter signal 120 to the predicted parameter signal 112 to generate a feedback signal 122. The comparator 118 transmits the feedback signal 122 to the second model 100 if a predetermined threshold is not met. The feedback signal 122 refines the stored data and/or instructions in the second model 100 to allow the second model 100 to more accurately predict the machine's 92 response to the control signal 108. The system 90 continues to operate during subsequent cycles with the first model 98 providing the response signal 106 to the controller 96 and the second model 100 providing the predicted parameter signal 112 to the feedback circuit 116 until the predetermined threshold is met. When the predetermined threshold is met, the comparator 118 sends a signal 124 to a switch 126 to change the communication lines between the system 90 components as shown in FIG. 6.

As shown in FIG. 6, during the second or subsequent cycle, the second model 100 receives the input signal 102 from the input device 94 and the first parameter signal 104 from the machine 92. The second model 100 accesses the stored data and/or instructions to generate the response signal 106 based on the input signal 102 and the first parameter signal 104. During the second or subsequent cycle, the first model 98 receives the first parameter signal 104 from the machine 92 and the control signal 108 from the controller 96. The first model 98 accesses the stored data and/or instructions to predict the response of the machine 92 to the control signal 108 and generate the predicted parameter signal 112. In this manner, the controller 96 regulates the operating parameter of the machine 92 based on information provided by the second model 100, while the first model 98 receives feedback signals 122 to improve the ability of the first model 98 to accurately predict the machine's response to the control signal 108.

When the predetermined threshold is met, the comparator 118 transmits the signal 124 to the switch 126, and the communication lines between the controller 96, first model 98, and second model 100 change back as shown in FIG. 5.

As previously described, each embodiment of the present invention allows a system to control an operating parameter of a machine while simultaneously updating a second or alternate controller or model. In this manner, the system can accurately regulate the operating parameter of the machine while simultaneously updating the second controller or model to reflect changes in the operation of the machine. As a result, the system is able to switch between a first controller and a second controller or a first model and a second model so that the system can reliably remain updated to changes in the operating characteristics of the machine without requiring any interruption in the operation of the machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a machine, comprising:
   a. an input signal, wherein the input signal conveys a desired operating parameter of the machine;
   b. a first parameter signal, wherein the first parameter signal conveys a measured parameter of the machine taken at a first time;
   c. a first model, wherein during a first cycle, the first model receives the input signal and the first parameter signal and generates a response signal based on the input signal and the first parameter signal;
   d. a controller, wherein the controller receives the response signal and generates a control signal to the machine based on the response signal;
   e. a second model, wherein during the first cycle, the second model receives the first parameter signal and the control signal and generates a predicted parameter signal based on the first parameter signal and the control signal;
   f. a second parameter signal, wherein the second parameter signal conveys the measured parameter of the machine taken at a second time;
   g. a feedback circuit, wherein the feedback circuit receives the second parameter signal and the predicted parameter signal and generates a feedback signal based on the second parameter signal and the predicted parameter signal; and
   h. a comparator, wherein during the first cycle, the comparator receives the feedback signal and transmits the feedback signal to the second model if a predetermined threshold is not met.

2. The system of claim 1, wherein the comparator switches the first model and the second model if the predetermined threshold is met during the first cycle, so that during a second cycle:
   a. the second model receives the input signal and the first parameter signal generates the response signal based on the input signal and the first parameter signal;
   b. the first model receives the first parameter signal and the control signal and generates the predicted parameter signal based on the first parameter signal and the control signal; and
   c. the comparator transmits the feedback signal to the first model if the predetermined threshold is not met.

3. The system of claim 2, wherein at least one of the first model or the second model includes programming that generates the predicted parameter signal.

4. The system of claim 3, wherein the feedback signal modifies the programming that generates the predicted parameter signal.

5. The system of claim 1, wherein the predetermined threshold is a time interval.

6. The system of claim 1, wherein the predetermined threshold is an acceptable magnitude for the feedback signal.

7. A method for controlling a machine, comprising:
   a. measuring a parameter at a first time to determine a first parameter value;
   b. comparing the first parameter value to a desired value;
   c. in a first cycle, transmitting a response signal from a first model to a controller based on the comparison between the first parameter value and the desired value;
   d. transmitting a control signal from the controller to the machine to vary the first parameter value;
   e. measuring the parameter at a second time to determine a second parameter value;
   f. in the first cycle, generating a predicted parameter value from a second model based on the first parameter value and the control signal;
   g. comparing the predicted parameter value to the second parameter value;
   h. generating a feedback signal based on the predicted parameter value and the second parameter value; and
   i. in the first cycle, transmitting the feedback signal to the second model if a predetermined threshold is not met.

8. The method of claim 7, further including modifying the second model based on the feedback signal.

9. The method of claim 7, further including switching the first model and the second model if the predetermined threshold is met during the first cycle, and further including during a second cycle:
   a. transmitting the response signal from the second model to the controller based on the comparison between the first parameter value and the desired value;
   b. generating the predicted parameter value from the first model based on the first parameter value and the control signal; and
   c. transmitting the feedback signal to the first model if the predetermined threshold is not met.

10. The method of claim 9, further including modifying the first model based on the feedback signal.

11. A method for controlling a machine, comprising:
   a. measuring a parameter at a first e to determine a first parameter value;
   b. receiving a desired value into a controller;
   c. in a first cycle, transmitting a request signal from the controller to a first model based on the first parameter value and the desired value;
   d. in the first cycle, transmitting a response signal from the first model to the controller;
   e. transmitting a control signal from the controller to the machine to vary the first parameter value;
   f. measuring the parameter at a second time to determine a second parameter value;

g. in the first cycle, generating a predicted parameter value from a second model based on the first parameter value and the control signal;
h. comparing the predicted parameter value to the second parameter value;
i. generating a feedback signal based on the predicted parameter value and the second parameter value; and
j. in the first cycle, transmitting the feedback signal to the second model if a predetermined threshold is not met.

12. The method of claim 11, further including modifying the second model based on the feedback signal.

13. The method of claim 11, further including switching the first model and the second model if the predetermined threshold is met during the first cycle, and further including during a second cycle:
a. transmitting the response signal from the second model to the controller based on the comparison between the first parameter value and the desired value;
b. generating the predicted parameter value from the first model based on the first parameter value and the control signal; and
c. transmitting the feedback signal to the first model if the predetermined threshold is not met.

14. The method of claim 13, further including modifying the first model based on the feedback signal.

* * * * *